United States Patent
Offerle et al.

(10) Patent No.: US 10,322,750 B2
(45) Date of Patent: Jun. 18, 2019

(54) POWER STEERING ASSEMBLY MOUNTS WITH TAPERED PROTRUSIONS

(71) Applicant: Ford Global Technologies, LLC, Dearborn, MI (US)

(72) Inventors: Timothy Offerle, Saline, MI (US); John Dalpiaz, New Boston, MI (US); Timothy Snider, Dearborn, MI (US); Donald Mattern, Canton, MI (US); Matthew Brimmer, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 155 days.

(21) Appl. No.: 15/470,406

(22) Filed: Mar. 27, 2017

(65) Prior Publication Data
US 2018/0273088 A1    Sep. 27, 2018

(51) Int. Cl.
*B62D 7/22*     (2006.01)
*B62D 5/06*     (2006.01)
*B62D 3/12*     (2006.01)
*B62D 21/11*    (2006.01)
*B62D 25/00*    (2006.01)
(Continued)

(52) U.S. Cl.
CPC ............... *B62D 7/226* (2013.01); *B62D 3/12* (2013.01); *B62D 5/062* (2013.01); *B62D 21/11* (2013.01); *B62D 25/00* (2013.01); *B60R 2011/0042* (2013.01); *B62D 5/00* (2013.01)

(58) Field of Classification Search
CPC ...... B60R 2011/001; B60R 2011/0042; B62D 21/00; B62D 3/00; B62D 3/12; B62D 27/023; B62D 27/04; B62D 7/226; B62D 7/228; B62D 21/11; F16F 1/3863; F16F 1/38
See application file for complete search history.

(56) References Cited

U.S. PATENT DOCUMENTS 2,344,848 A * 3/1944 Berry .................. B62D 1/16
                                                    280/780
2,740,650 A * 4/1956 Hutton .................. F16F 1/38
                                                    403/224
(Continued)

FOREIGN PATENT DOCUMENTS

CN    105864334    8/2016
CN    205661517    10/2016
(Continued)

OTHER PUBLICATIONS

Used Volkswagen Passat Steering box—5Q1423105F—Boonstra Autoparts, retrieved from https://www.proxyparts.com/car-parts-stock/information/part-number/5q1423105f/part/steering-box/partid/6079149/, on Mar. 27, 2017, 10 pages.

*Primary Examiner* — Paul N Dickson
*Assistant Examiner* — Timothy Wilhelm
(74) *Attorney, Agent, or Firm* — Ray Coppiellie; Hanley, Flight & Zimmerman, LLC (57) ABSTRACT

Example power steering assembly mounts with tapered protrusions apparatus disclosed herein include a power steering assembly. The power steering assembly includes a housing. The housing includes a flexible mount and a rigid mount to attach the power steering assembly to a subframe. The rigid mount includes a tapered protrusion to deform the subframe to reduce movement of the rigid mount relative to the subframe.

20 Claims, 6 Drawing Sheets

(51) Int. Cl.
*B62D 5/00* (2006.01)
*B60R 11/00* (2006.01)

(56) References Cited

U.S. PATENT DOCUMENTS

| | | | | |
|---|---|---|---|---|
| 3,951,477 A * | 4/1976 | Townshend | ............ | F16F 1/3732 |
| | | | | 384/440 |
| 4,109,979 A * | 8/1978 | Estaque | ................... | B60G 7/02 |
| | | | | 267/269 |
| 5,024,283 A * | 6/1991 | Deli | ................... | B62D 33/0604 |
| | | | | 180/89.14 |
| 5,388,884 A * | 2/1995 | Keehner | ............. | B60G 99/002 |
| | | | | 296/190.03 |
| 5,538,274 A * | 7/1996 | Schmitz | ................... | B60G 3/20 |
| | | | | 267/141.2 |
| 5,597,049 A * | 1/1997 | Bruehl | ................... | B62D 3/123 |
| | | | | 180/400 |
| 5,961,219 A * | 10/1999 | Maughan | ................... | F16F 1/38 |
| | | | | 384/220 |
| 6,095,481 A * | 8/2000 | Norkus | ................ | B60G 99/004 |
| | | | | 248/560 |
| 6,164,405 A * | 12/2000 | Sakata | ..................... | B60G 3/24 |
| | | | | 180/400 |
| 6,273,209 B1 * | 8/2001 | Saito | ........................ | B62D 3/12 |
| | | | | 180/428 |
| 6,354,627 B1 * | 3/2002 | Kasuga | ................. | B62D 21/00 |
| | | | | 280/781 |
| 6,397,701 B1 * | 6/2002 | Park | ........................ | B62D 3/12 |
| | | | | 280/775 |
| 6,666,438 B2 * | 12/2003 | Nakagawa | ............ | F16F 1/3814 |
| | | | | 267/140.12 |
| 6,694,843 B2 * | 2/2004 | Bartosch | ................. | F16H 53/06 |
| | | | | 74/567 |
| 6,767,020 B2 * | 7/2004 | Yamamoto | ........... | B60G 99/004 |
| | | | | 280/124.109 |
| 7,331,590 B2 * | 2/2008 | Spetz | ........................ | B62D 3/12 |
| | | | | 280/93.514 |
| 7,481,401 B2 * | 1/2009 | Hyslop | .................... | B62D 3/12 |
| | | | | 180/428 |
| 7,976,037 B2 * | 7/2011 | Yoshida | ................. | B62D 21/11 |
| | | | | 280/124.109 |
| 8,484,930 B2 * | 7/2013 | Ruehl | .................... | B62D 21/00 |
| | | | | 280/797 |
| 8,523,206 B2 * | 9/2013 | Degenstein | ............... | B62D 3/12 |
| | | | | 180/428 |
| 8,657,060 B2 * | 2/2014 | Ohno | ................... | B60K 15/063 |
| | | | | 180/291 |
| 8,740,231 B2 * | 6/2014 | Shibaya | ................. | B62D 21/00 |
| | | | | 280/124.109 |
| 9,527,524 B2 * | 12/2016 | Sato | ........................ | B62D 3/12 |
| 9,902,420 B2 * | 2/2018 | Park | ........................ | B62D 7/1581 |
| 10,046,795 B2 * | 8/2018 | Lee | ........................ | F16F 1/3814 |
| 10,054,179 B2 * | 8/2018 | Trotter | ................... | B60G 7/001 |
| 2008/0230676 A1 * | 9/2008 | Hansemann | ........ | F16F 1/3732 |
| | | | | 248/634 |
| 2009/0189051 A1 * | 7/2009 | Love | ..................... | F16F 1/3935 |
| | | | | 248/635 |
| 2011/0192673 A1 | 8/2011 | Coleman et al. | | |

FOREIGN PATENT DOCUMENTS

| | | |
|---|---|---|
| DE | 102010022015 | 12/2010 |
| DE | 102012011601 | 12/2013 |
| DE | 202014103850 | 9/2014 |
| DE | 102014111395 | 2/2016 |
| JP | 2015131592 | 7/2015 |

* cited by examiner

POWER STEERING ASSEMBLY MOUNTS WITH TAPERED PROTRUSIONS

FIELD OF THE DISCLOSURE

This disclosure relates generally to automobiles and, more particularly, to power steering assembly mounts with tapered protrusions.

BACKGROUND

Automobiles are typically equipped with power steering systems. In such systems, a power steering assembly provides assistive force to control the orientation of wheels of the automobile. In these systems, the power steering assembly is typically attached to a subframe of the automobile.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

SUMMARY

Power steering assembly mounts with tapered protrusions are disclosed herein. In some examples, an apparatus is disclosed. In some disclosed examples, the apparatus comprises a power steering assembly. In some disclosed examples, the power steering assembly includes a housing. In some disclosed examples, the housing includes a flexible mount and a rigid mount to attach the power steering assembly to a subframe. In some disclosed examples, the rigid mount includes a tapered protrusion to deform the subframe to reduce movement of the rigid mount relative to the subframe.

In some examples, another apparatus is disclosed. In some disclosed examples, the apparatus comprises a housing of a power steering assembly. In some disclosed examples, the housing includes a flexible mount at a first end of the power steering assembly and a rigid mount including a tapered protrusion at a second end of the power steering assembly. In some disclosed examples, the flexible mount and the rigid mount are to attach the power steering assembly to a subframe. In some disclosed examples, the tapered protrusion is to enlarge a first opening in the subframe to fix the rigid mount relative to the subframe.

In some examples, another apparatus is disclosed. In some disclosed examples, the apparatus comprises a housing of a power steering assembly. In some disclosed examples, the housing includes a steering input end and a rigid mount adjacent the steering input end to attach the housing to a vehicle subframe. In some disclosed examples, the rigid mount includes a tapered protrusion to deform the subframe to reduce sliding movement of the rigid mount relative to the subframe. In some disclosed examples, the housing includes a flexible mount to attach the housing to the vehicle subframe.

DETAILED DESCRIPTION

Conventional power steering assemblies are known to have mounts with doweled fasteners that fit (e.g., register, pilot, insert, slide, etc.) into openings of a vehicle subframe to reduce movement of the power steering assembly relative to the subframe. These known doweled fasteners and openings must be toleranced to fit closely yet also to be easily and quickly assembled in a vehicle production facility. The complexity associated with the precise manufacturing and assembly of closely-toleranced subframe and power steering assembly components results in increased costs.

More specifically, many of the above-mentioned known power steering assembly mounts include an internally-threaded dowel (e.g., a nut with an integral dowel) to threadably engage with a threaded fastener and a subframe opening. During assembly, the power steering assembly is precisely aligned with the subframe to fit the outer diameter of the dowel into the inner diameter of the opening and the threaded fastener is subsequently tightened. As a result, vehicle assembly time and associated costs increase.

Unlike the known power steering assemblies mentioned above, the example power steering assemblies described herein employ a rigid mount with a tapered protrusion that can deform a vehicle subframe to produce a precise fit between the mount and the subframe during assembly of the power steering assembly to the subframe. Additionally, the example power steering assemblies described herein include a flexible mount that includes elastomeric bushings to accommodate dimensional tolerances in the subframe and to reduce transmission of (e.g., dampen) engine vibrations to the power steering assembly. More specifically, to attach a power steering assembly to a subframe, the rigid and flexible mounts are threadably engaged with respective first and second threaded fasteners inserted through first and second openings in the subframe. When the first threaded fastener is tightened, the tapered protrusion of the rigid mount deforms the subframe and is tightly captured in the subframe. In other words, the tapered protrusion interferes with the subframe to produce a crush fit between the rigid mount and the subframe. When the second threaded fastener is tightened, the elastomeric bushings of the flexible mount may flex to conform or accommodate to dimensional differences (e.g., tolerances) between the power steering assembly and the subframe. Thus, sliding movement of the power steering assembly relative to the subframe is reduced (e.g., the power steering assembly is laterally fixed to the subframe) by the tapered protrusion and stress on the power steering assembly is reduced by the elastomeric bushings. Further, assembly of the power steering assembly to the subframe is simplified because a precise fit between the rigid mount and the subframe is produced via the tapered protrusion when the mount is tightened to the subframe (e.g., steps to precisely align and the power steering assembly to the subframe before tightening the threaded fasteners may be eliminated).

Figure 1:
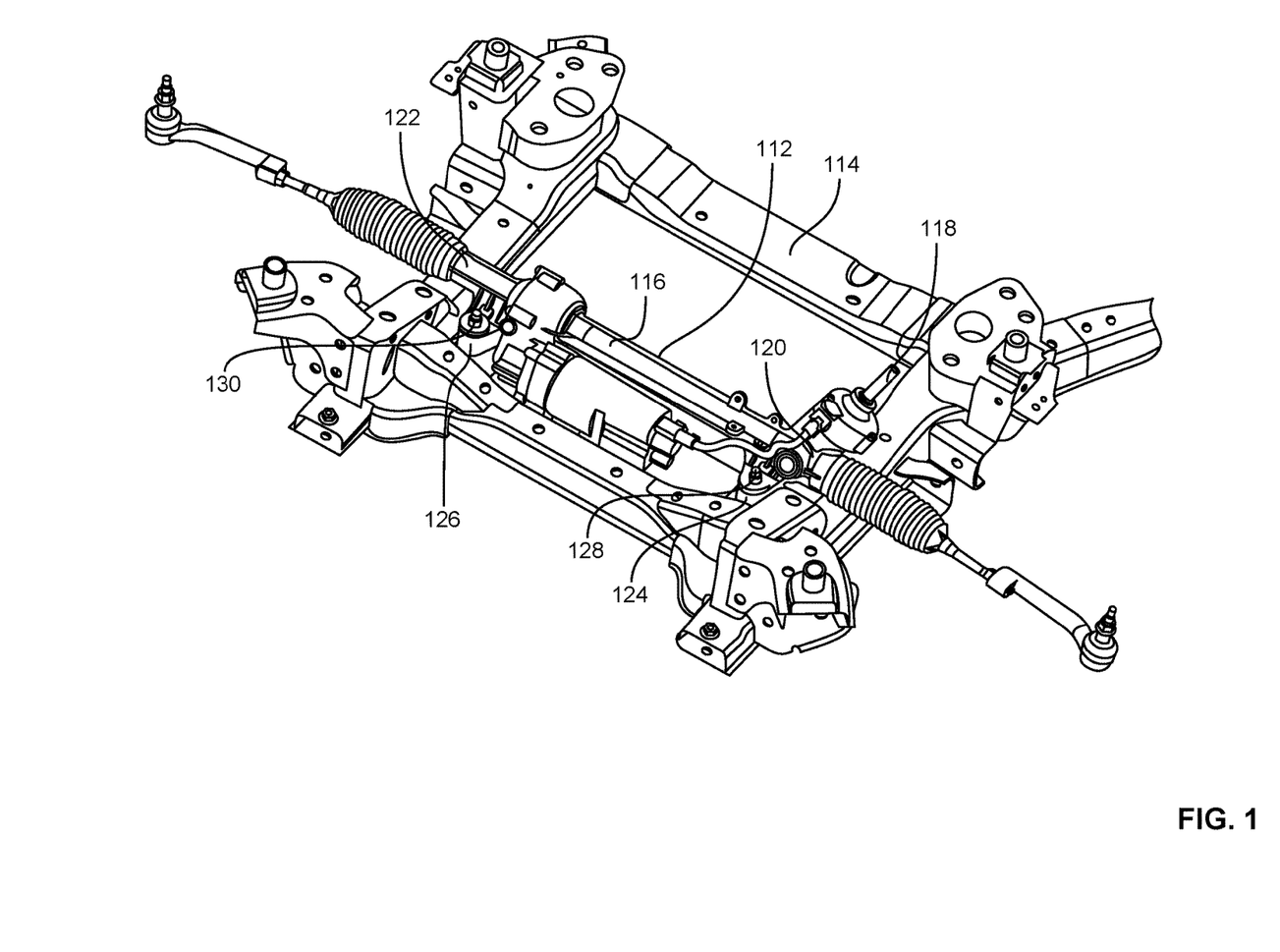
FIG. 1 is a perspective view of a power steering assembly mounted to a vehicle subframe.

FIG. 1 is a perspective view of a power steering assembly 112 mounted to a vehicle subframe 114. In the illustrated example of FIG. 1, the power steering assembly 112 includes a housing 116, a steering input 118, a first end 120, and a second end 122. The housing includes a rigid mount 124 and a flexible mount 126 through which a first threaded fastener 128 and a second threaded fastener 130, respectively, pass to couple the power steering assembly 112 to the subframe 114.

In the illustrated example of FIG. 1, the rigid mount 124 is located at the first end 120 adjacent the steering input 118. The first threaded fastener 128 is inserted from the underside of the subframe 114 through a first opening 344 (FIGS. 3 and 6) to threadably engage with the rigid mount 124 to attach the housing 116 to the subframe 114. The rigid mount 124 enables tactile feedback (e.g., steering feel) to be efficiently transmitted from the subframe 114 to a driver.

In the illustrated example of FIG. 1, the flexible mount 126 is located at the second end 122 adjacent an engine (not shown in FIG. 1). The second threaded fastener 130 is inserted from the underside of the subframe 114 through a second opening 442 (FIGS. 4-5) to threadably engage with the flexible mount 126 to attach the housing 116 to the subframe 114. The flexible mount 126 dampens engine vibrations that would otherwise be transmitted to a driver via the subframe 114, the flexible mount 126, the housing 116, the steering input 118, and/or upper steering components (e.g., an intermediate shaft, a steering column, a steering wheel, etc.) (not shown in FIG. 1). For example, the flexible mount 126 reduces engine vibration entering the housing 116 from the subframe 114. Further, the flexible mount 126 may flex to accommodate dimensional differences (e.g., manufacturing tolerances) between the subframe 114 and the power steering assembly 112. Thus, stress (e.g., twisting, torsion, bending, etc.) on the housing 116 when the power steering assembly is mounted to the subframe 114 may be reduced. Additionally, binding of internal components (not shown in FIG. 1) of the power steering assembly 112 against one another and/or the housing 116 may also be reduced.

Figure 2:
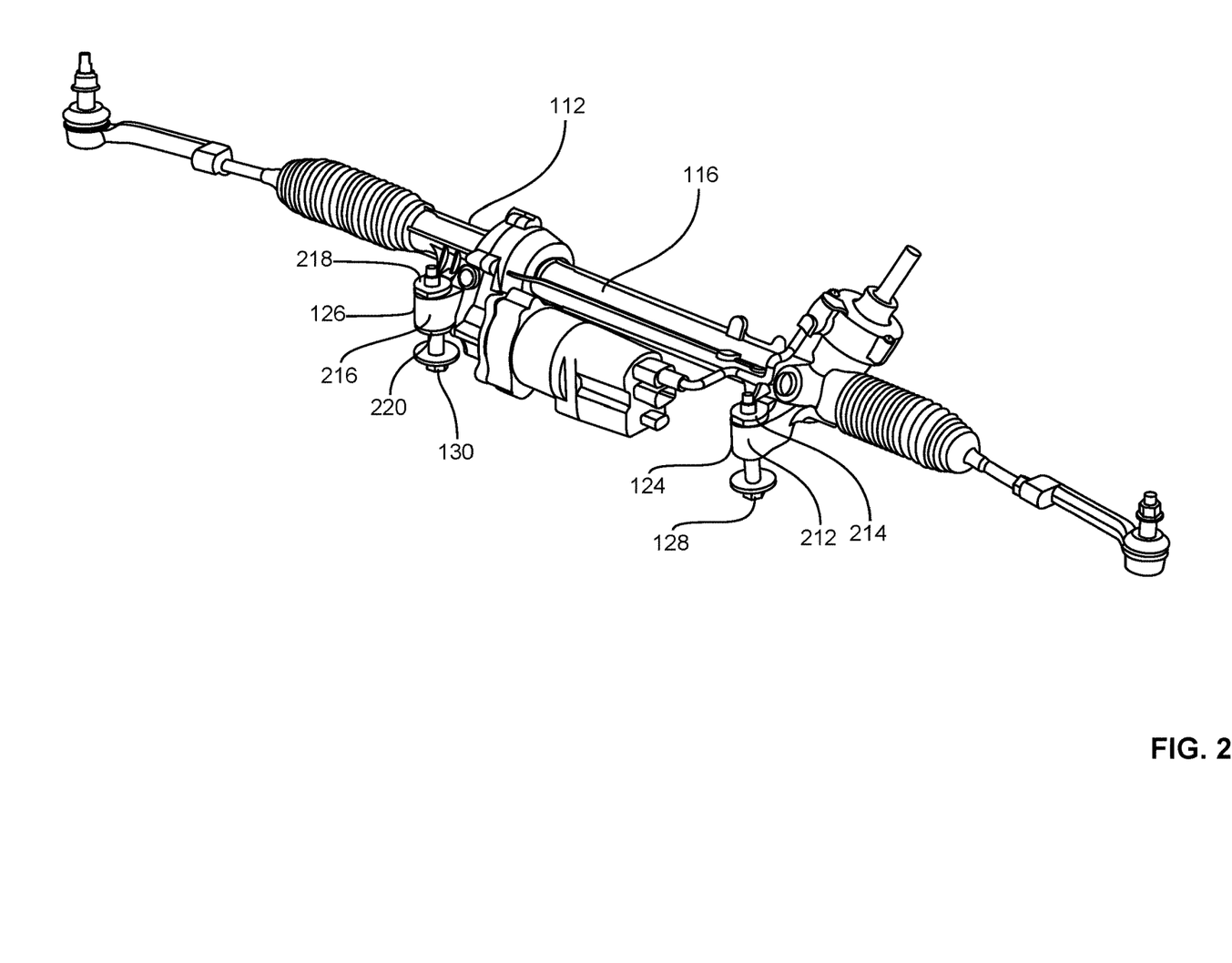
FIG. 2 is a perspective view of the power steering assembly of FIG. 1.
Figure 3:
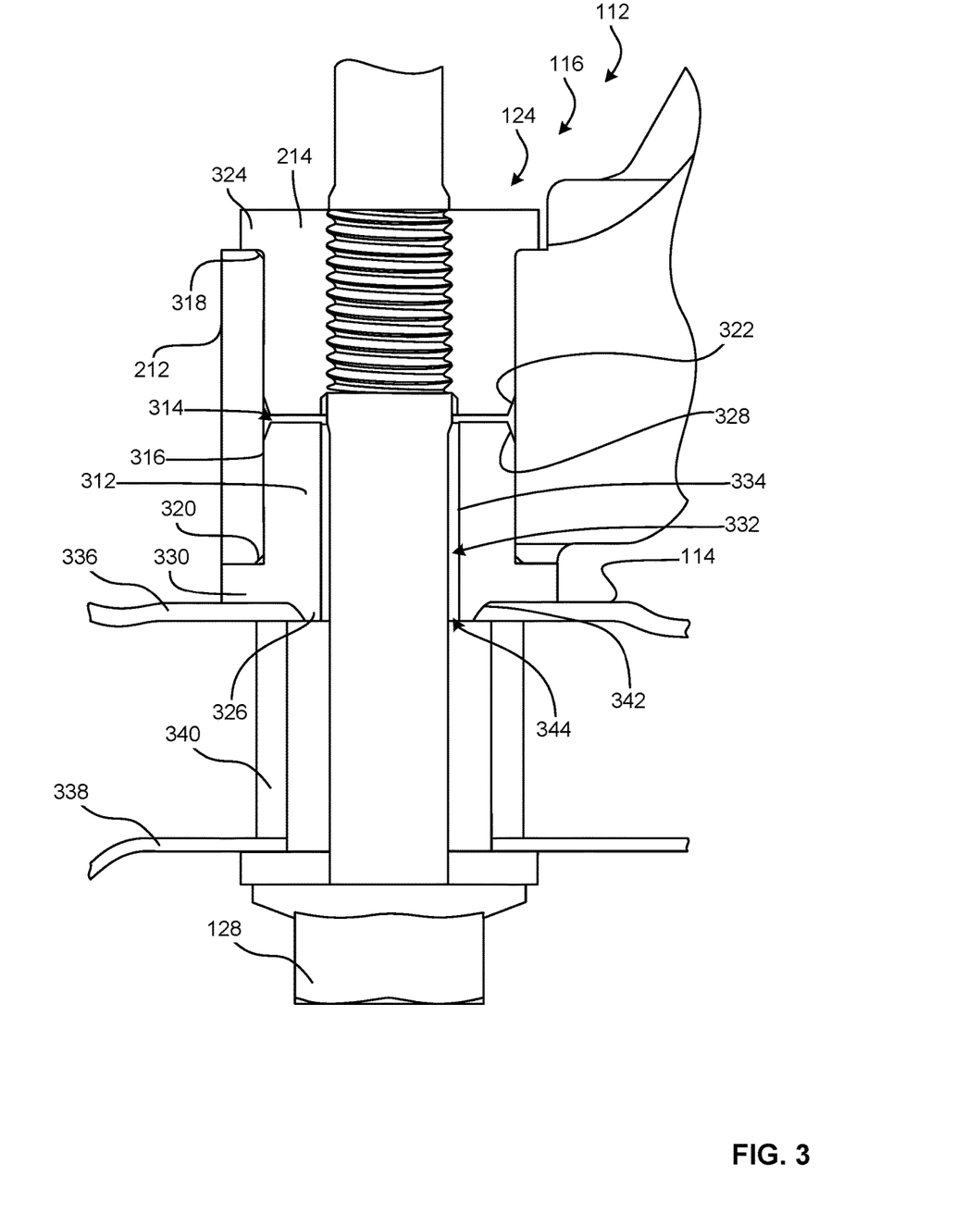
FIG. 3 is a cross-sectional view of the rigid mount of the power steering assembly of FIGS. 1 and 2 mounted on the subframe of FIG. 1.

FIG. 2 is a perspective view of the power steering assembly 112 of FIG. 1. In the illustrated example of FIG. 2, the rigid mount 124 includes a first lobe 212, a first insert 214, and a second insert 312 (FIG. 3). In the illustrated example of FIG. 2, the flexible mount 126 includes a second lobe 216, a third insert 218, and a fourth insert 220. The first and second lobes 212, 216 are integral with the housing 116. The first insert 214 is internally threaded to threadably engage with the first threaded fastener 128 and the third insert 218 is internally threaded to threadably engage with the second threaded fastener 130.

FIG. 3 is a cross-sectional view of the rigid mount 124 of the power steering assembly 112 of FIGS. 1 and 2 mounted on the subframe 114 of FIG. 1. In the illustrated example of FIG. 3, the second insert 312 is visible. As shown in the example of FIG. 3, the first lobe 212 further includes a third opening 314 defined by a first inner wall 316, a first taper 318 and a second taper 320. As used herein, the term "taper" refers to radii, chamfers, bevels, etc. In the example of FIG. 3, the first insert 214 is internally threaded and includes a third taper 322 and a first flange 324. As depicted in the example of FIG. 3, the second insert 312 includes a first tapered protrusion 326, a fourth taper 328, a second flange 330, and a fourth opening 332 defined by a second inner wall 334. In the illustrated example of FIG. 3, the subframe 114 further includes a first plate 336, a second plate 338, a first crush tube 340 and a third inner wall 342 defining the first opening 344.

In the illustrated example of FIG. 3, the first insert 214 is disposed (e.g., pressed into, inserted, etc.) in the third opening 314 of the first lobe 212. The first and third tapers 318, 322 facilitate introduction (e.g., alignment) of the first insert 214 into the third opening 314. The first flange 324 provides a hard stop during assembly of the rigid mount 124 and prevents the first insert 214 from being drawn through the first lobe 212 when the first threaded fastener 128 is tightened. Alternatively, the first insert 214 may be unitary (e.g., integral) with the first lobe 212 (not shown in FIG. 3).

In the illustrated example of FIG. 3, the second insert 312 is disposed in the third opening 314 of the first lobe 212 opposite the first insert 214. The second and fourth tapers 320, 328 facilitate introduction of the second insert 312 into the third opening 314. As shown in the example of FIG. 3, a clearance space remains between the first and second inserts 214, 312. Thus, as depicted in the example of FIG. 3, the first lobe 212 is captured between the first and second inserts 214, 312. The first threaded fastener 128 passes through the fourth opening 332. The second flange 330 provides a hard stop during assembly of the rigid mount 124 and prevents the second insert 312 from being pushed through the first lobe 212 when the first threaded fastener 128 is tightened in the first insert 214.

In the illustrated example of FIG. 3, the first tapered protrusion 326 has a trapezoidal cone-shaped profile. Additionally or alternatively, the first tapered protrusion 326 profile may be triangular, arced, chamfered, etc. When the first threaded fastener 128 is threaded into the first insert 214, the first tapered protrusion 326 fits into (e.g., self-locates within) the first opening 344 to engage the third inner wall 342. When the first threaded fastener 128 is further threaded and tightened in the first insert 214, the first insert 214 engages the first lobe 212, which engages the second insert 312. Thus, the second insert 312 is drawn toward the first plate 336 and the first tapered protrusion 326 deforms (e.g., crushes, bends, bows, shapes, etc.) the third inner wall 342 and the surrounding area of the first plate 336 to occupy the first opening 344. In other words, the first tapered protrusion 326 forces the third inner wall 342 into a corresponding tapered concavity. In yet other words, the first tapered protrusion 326 presses on the third inner wall 342 to enlarge the first opening 344. Thus, a precise fit (e.g., an interference fit, a zero-clearance fit, etc.) is produced between the first tapered protrusion 326 and the third inner wall 342. Further, because the first tapered protrusion 326 is precisely fit into the deformed first opening 344, the rigid mount 124 is constrained laterally with respect to the first plate 336. In other words, the first tapered protrusion 326 reduces (e.g., prevents) sliding movement of the rigid mount 124 along the subframe 114.

In the illustrated example of FIG. 3, the first crush tube 340 is disposed between and supports the first and second plates 336, 338. The first crush tube 340 prevents the first and second plates 336, 338 from being crushed together when the first threaded fastener 128 is tightened. Further, the first crush tube 340 provides a reaction force to the first threaded fastener 128 when the first threaded fastener 128 is tightened to engage the second insert 312 with the first plate 336 and to deform the third inner wall 342 with the first tapered protrusion 326. Thus, because the rigid mount is constrained with respect to the subframe 114 by the first threaded fastener 128 and the first tapered protrusion 326, the first end (not shown in FIG. 3) of the housing 116 is rigidly attached to the subframe 114.

Figure 4:
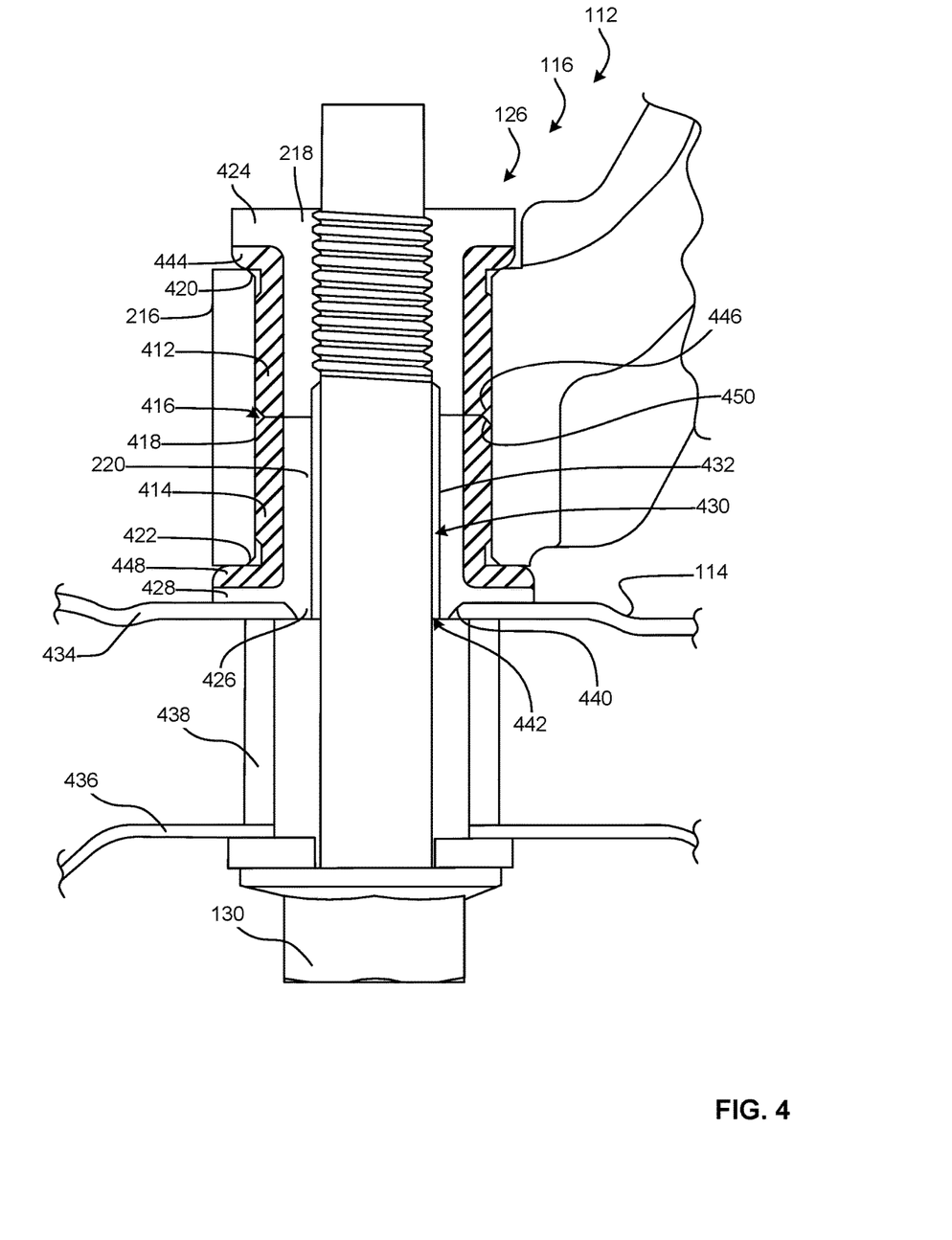
FIG. 4 is a cross-sectional view of the flexible mount of the power steering assembly of FIGS. 1 and 2 mounted on the subframe of FIG. 1.

FIG. 4 is a cross-sectional view of the flexible mount 126 of the power steering assembly 112 of FIGS. 1 and 2 mounted on the subframe 114 of FIG. 1. In the illustrated example of FIG. 4, the second lobe 216 further includes a first elastomeric bushing 412, a second elastomeric bushing 414, and a fifth opening 416 defined by a fourth inner wall 418, a fifth taper 420, and a sixth taper 422. In the example of FIG. 4, the third insert 218 is internally threaded and includes a third flange 424. As depicted in the example of FIG. 4, the fourth insert 220 includes a second tapered protrusion 426, a fourth flange 428, and a sixth opening 430 defined by a fifth inner wall 432. In the illustrated example of FIG. 4, the subframe 114 further includes a third plate 434, a fourth plate 436, a second crush tube 438 and a sixth inner wall 440 defining the second opening 442. In the illustrated example of FIG. 4, the first elastomeric bushing 412 includes a fifth flange 444 and a seventh taper 446. As shown in the example of FIG. 3, the second elastomeric bushing 414 includes a sixth flange 448 and an eighth taper 450.

In the illustrated example of FIG. 4, the third insert 218 is disposed in the first elastomeric bushing 412, which is further disposed (e.g., pressed into, inserted, etc.) in the fifth opening 416 of the second lobe 216. The fifth and seventh tapers 420, 446 facilitate introduction of the first elastomeric bushing 412 into the fifth opening 416. The third and fifth flanges 424, 444 provides a stop during assembly of the flexible mount 126 and prevent the third insert 218 and the first elastomeric bushing 412 from being drawn through the second lobe 216 when the second threaded fastener 130 is tightened.

In the illustrated example of FIG. 4, the fourth insert 220 is disposed in the second elastomeric bushing 414, which is further disposed in the fifth opening 416 of the second lobe 216. The sixth and eighth tapers 422, 450 facilitate introduction of the second elastomeric bushing 414 into the fifth opening 416. The second threaded fastener 130 passes through the sixth opening 430. The fourth and sixth flanges 428, 448 provide a stop during assembly of the flexible mount 126 and prevent the fourth insert 220 and the second elastomeric bushing 414 from being pushed through the second lobe 216 when the second threaded fastener 130 is tightened in the third insert 218.

In the illustrated example of FIG. 4, the third insert 218 is engaged with the fourth insert 220. When the second threaded fastener 130 is threaded into the third insert 218, the third insert 218 engages the fourth insert 220 to fit the second tapered protrusion 426 into the second opening 442 to engage the sixth inner wall 440. When the second threaded fastener 130 is tightened in the third insert 218, the fourth insert 220 is drawn toward the third plate 434 and the second tapered protrusion 426 deforms the sixth inner wall 440 and the surrounding area of the third plate 434 to occupy the second opening 442 and to produce a precise fit between the second tapered protrusion 426 and the sixth inner wall 440. Because the second tapered protrusion 426 is precisely fit into the deformed second opening 442, the flexible mount 126 is constrained laterally (e.g., sliding movement is reduced or prevented) with respect to the third plate 434 of the subframe 114. Alternatively, the fourth insert 220 may not include the second tapered protrusion 426 to form a flat joint with the third plate 434.

In the illustrated example of FIG. 4, the second crush tube 438 is disposed between and supports the third and fourth plates 434, 436 to prevent the third and fourth plates 434, 436 from being crushed together when the second threaded fastener 130 is tightened and to provide a reaction force when the second threaded fastener 130 is tightened.

In the illustrated example of FIG. 4, the first and second elastomeric bushings 412, 414 are disposed between the third and fourth inserts 218, 220 and the second lobe 216. Thus, the first and second elastomeric bushings 412, 414 form a flexible interface between the third and fourth inserts 218, 220 and the second lobe 216. When the second threaded fastener 130 is tightened, the third and fourth inserts 218, 220 are aligned with the subframe 114 and the first and second elastomeric bushings 412, 414 flex to allow the second lobe 216 to move (e.g., rotate and/or translate) relative to the third and fourth inserts 218, 220. Thus, the first and second elastomeric bushings 412, 414 may accommodate dimensional differences between the subframe 114 and the housing 116. Further, the first and second elastomeric bushings 412, 414 may dampen (e.g., isolate, impede, prevent, reduce, etc.) transmission of engine vibrations from the subframe 114 into the second lobe 216 and further downstream components (e.g., the housing 116, the steering input 118 of FIGS. 1 and 2, etc.). Thus, because the third and fourth inserts 218, 220, the second threaded fastener 130, and the subframe 114 may move relative to the second lobe 216 via the first and second elastomeric bushings 412, 414, the second end 122 (FIG. 1) of the housing 116 is flexibly attached to the subframe 114.

Figure 5:
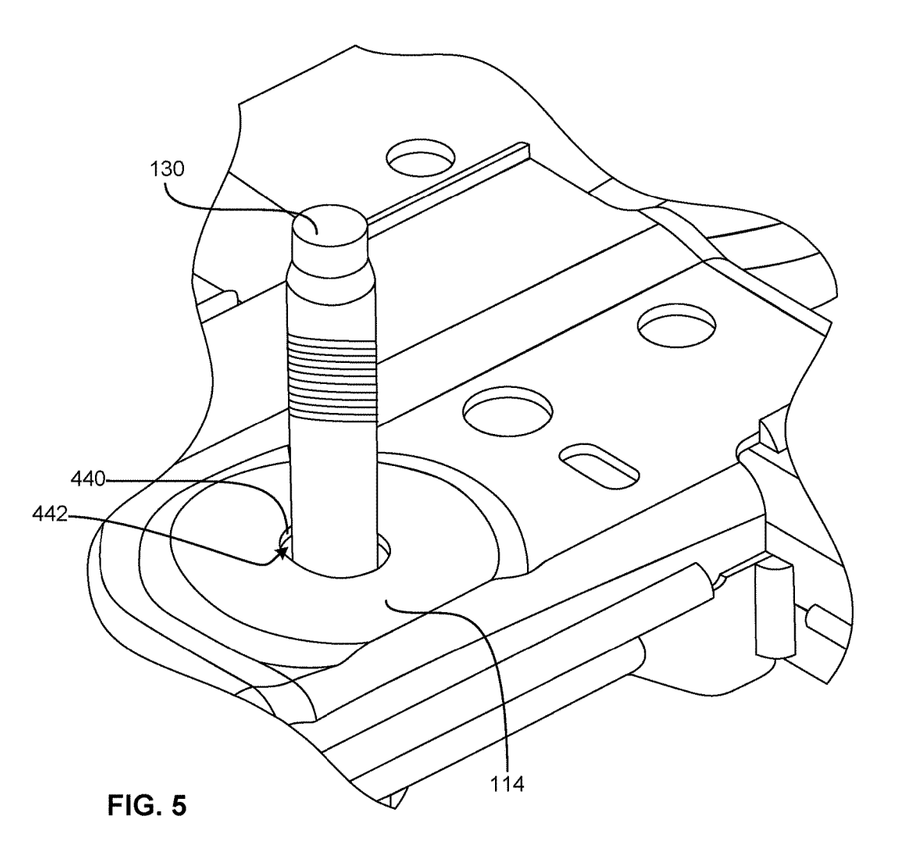
FIG. 5 is a perspective view of the second threaded fastener of FIGS. 1, 2, and 4 in the second opening of the subframe of FIGS. 1 and 4.

FIG. 5 is a perspective view of the second threaded fastener 130 of FIGS. 1, 2, and 4 in the second opening 442 of the subframe 114 of FIGS. 1 and 4. In the illustrated example of FIG. 5, the power steering assembly 112 of FIGS. 1-4 is omitted for clarity. As shown in FIG. 5, the sixth inner wall 440 is elongated or ovular to define the second opening 442 as a slot. Thus, the second threaded fastener 130 may translate relative to the subframe 114 to accommodate dimensional differences between power steering assembly 112 of FIGS. 1-4 and the subframe 114. Further, the second tapered protrusion 426 of FIG. 4 engages and deforms a portion of the sixth inner wall 440 and occupies a portion of the second opening 442. Alternatively, the sixth inner wall 440 may be substantially circular to define the second opening 442 as a round hole (not shown in FIG. 5).

Figure 6:
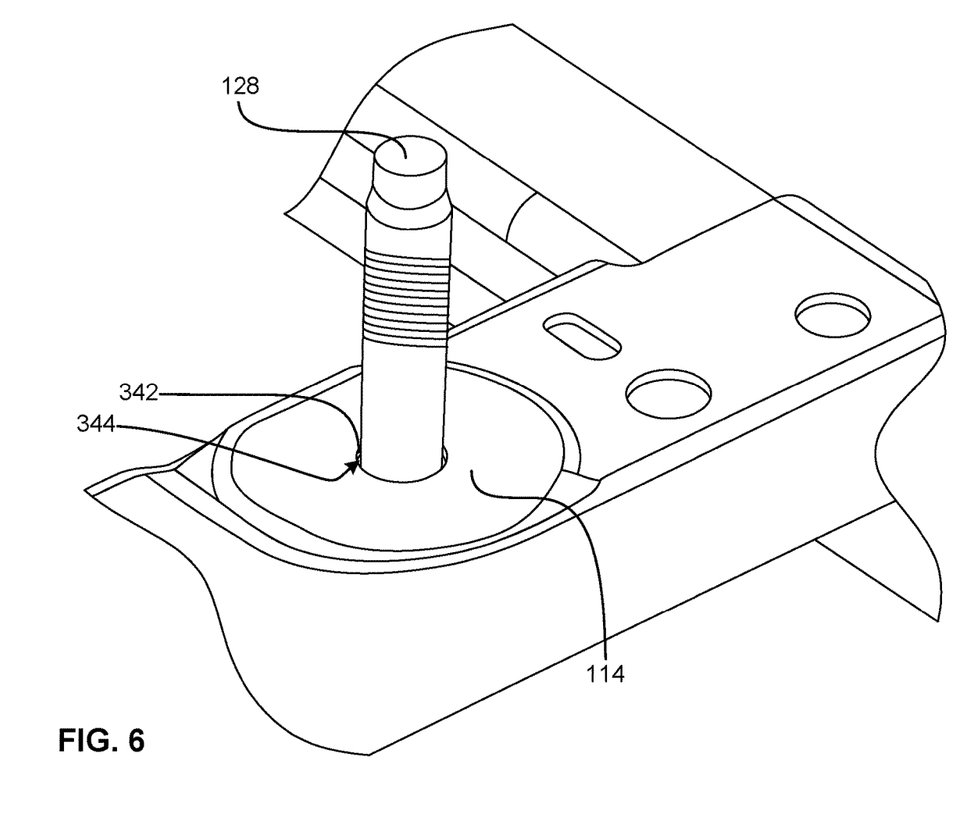
FIG. 6 is a perspective view of the first threaded fastener of FIGS. 1-3 in the first opening of the subframe of FIGS. 1 and 3.

FIG. 6 is a perspective cutaway view of the first threaded fastener 128 of FIGS. 1-3 in the first opening 344 of the subframe 114 of FIGS. 1 and 3. In the illustrated example of FIG. 6, the power steering assembly 112 of FIGS. 1-4 is omitted for clarity. As shown in FIG. 6, the third inner wall 342 is substantially circular to define the first opening 344 as a round hole. Thus, the first tapered protrusion 326 of FIG. 4 circumferentially engages and deforms of the third inner wall 342 to occupy the first opening 344.

From the foregoing, it will be appreciated that the above disclosed methods, apparatus and articles of manufacture may facilitate mounting of power steering assemblies to vehicle subframes. Thus, vehicle manufacturing complexity, manufacturing time, and associated costs may be reduced. Further the disclosed power steering assembly may increase tactile steering feedback (e.g., steering feel) while isolating engine vibration, thus improving the driving experience of a driver and/or vehicle dynamics. Additionally, the flexibility of the disclosed power steering assemblies to accommodate manufacturing tolerances of subframes may reduce premature wear of the power steering assemblies and associated replacement and/or repair costs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a power steering assembly including a housing, the housing including an internally-threaded flexible mount and an internally-threaded rigid mount, the flexible and rigid mounts configured to attach the power steering assembly to a subframe, the rigid mount including a tapered protrusion configured to deform the subframe to reduce movement of the rigid mount relative to the subframe.

2. The apparatus of claim 1, wherein the rigid mount includes:
   a lobe having an opening;
   a first insert positioned in the opening, the first insert including the tapered protrusion; and
   a second insert positioned in the opening opposite the first insert.

3. The apparatus of claim 2, wherein the second insert is spaced apart from the first insert.

4. The apparatus of claim 2, wherein the second insert is unitary with the lobe.

5. The apparatus of claim 1, wherein the flexible mount includes:
   a lobe having an opening;
   a first insert positioned in the opening;
   a first bushing positioned in the opening and around the first insert;
   a second insert positioned in the opening opposite the first insert; and
   a second bushing positioned in the opening and around the second insert.

6. The apparatus of claim 5, wherein the opening has an ovular shape.

7. The apparatus of claim 1, wherein the tapered protrusion is a first tapered protrusion, and wherein the flexible mount includes a second tapered protrusion.

8. The apparatus of claim 1, wherein the flexible mount is located at an end of the power steering assembly adjacent an engine location, the flexible mount configured to reduce engine vibration transmission through the power steering assembly to a driver.

9. The apparatus of claim 1, wherein the rigid mount is located at an end of the power steering assembly adjacent a steering input location, the flexible mount configured to provide tactile feedback to a driver through the power steering assembly.

10. An apparatus comprising:
    a housing of a power steering assembly including an internally-threaded flexible mount located at a first end of the power steering assembly and an internally-threaded rigid mount located at a second end of the power steering assembly opposite the first end, the flexible and rigid mounts configured to attach the power steering assembly to a subframe, the rigid mount including a tapered protrusion configured to enlarge a first opening in the subframe to fix the rigid mount relative to the subframe.

11. The apparatus of claim 10, wherein the rigid mount is configured to engage with the subframe via a threaded fastener inserted through the first opening and threaded into the rigid mount, the tapered protrusion configured to deform the subframe when the threaded fastener is tightened.

12. The apparatus of claim 10, wherein the flexible mount is configured to engage with the subframe via a threaded fastener inserted through a second opening in the subframe and threaded into the flexible mount.

13. The apparatus of claim 12, wherein the first opening has a circular shape and the second opening has an ovular shape.

14. The apparatus of claim 12, wherein the tapered protrusion is a first tapered protrusion, and wherein the flexible mount includes a second tapered protrusion configured to deform a portion of the subframe surrounding the second opening when the threaded fastener is tightened.

15. The apparatus of claim 10, wherein the flexible mount includes:
    a lobe having a second opening;
    opposing first and second elastomeric bushings positioned in the second opening;
    a first insert positioned in the first elastomeric bushing; and
    a second insert positioned in the second elastomeric bushing.

16. The apparatus of claim 10, wherein the flexible mount is configured to flex relative to the housing to accommodate a manufacturing tolerance of the subframe to reduce stress on the housing.

17. The apparatus of claim 10, wherein the rigid mount includes:
    a lobe having a second opening; and
    opposing first and second inserts positioned in the second opening.

18. The apparatus of claim 17, wherein the first insert is unitary with the lobe.

19. An apparatus comprising:
    a housing of a power steering assembly including:
      a steering input end;
      an internally-threaded rigid mount located adjacent the steering input end and configured to attach the housing to a vehicle subframe, the rigid mount including a tapered protrusion configured to deform the subframe to reduce sliding movement of the rigid mount relative to the subframe; and
      an internally-threaded flexible mount configured to attach the housing to the vehicle subframe.

20. The apparatus of claim 19, wherein the flexible mount includes an elastomeric bushing to reduce engine vibration transmission through the housing.

* * * * *